(12) United States Patent
Schanz

(10) Patent No.: US 11,235,430 B2
(45) Date of Patent: Feb. 1, 2022

(54) DEVICE FOR DETACHABLY SECURING MODULES

(71) Applicant: SAUTER FEINMECHANIK GMBH, Metzingen (DE)

(72) Inventor: Manfred Schanz, Reutlingen (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 443 days.

(21) Appl. No.: 16/321,068

(22) PCT Filed: Aug. 3, 2017

(86) PCT No.: PCT/EP2017/000940
§ 371 (c)(1),
(2) Date: Jan. 28, 2019

(87) PCT Pub. No.: WO2018/033235
PCT Pub. Date: Feb. 22, 2018

(65) Prior Publication Data
US 2019/0160612 A1 May 30, 2019

(30) Foreign Application Priority Data
Aug. 13, 2016 (DE) .................... 10 2016 009 895.3

(51) Int. Cl.
*B23Q 1/00* (2006.01)
*B23B 31/107* (2006.01)

(52) U.S. Cl.
CPC ........ *B23Q 1/0072* (2013.01); *B23B 31/1078* (2013.01); *B23Q 2220/002* (2013.01)

(58) Field of Classification Search
CPC ...... B23Q 1/0072; B23Q 1/28; B23Q 1/0063; B23Q 2220/002; B23Q 3/103; B23B 31/1078; B25B 11/00
(Continued)

(56) References Cited

U.S. PATENT DOCUMENTS

| 4,913,481 A | 4/1990 | Chin et al. |
| 5,961,261 A | 10/1999 | Stark |
| 2004/0256780 A1* | 12/2004 | Lang .................... B23Q 16/00 269/309 |

FOREIGN PATENT DOCUMENTS

| DE | 101 55 077 | 7/2004 |
| DE | 10 2014 112 843 | 3/2016 |

(Continued)

OTHER PUBLICATIONS

International Search Report (ISR) dated Feb. 13, 2018 in International (PCT) Application No. PCT/EP2017/000940.

*Primary Examiner* — Seahee Hong
(74) *Attorney, Agent, or Firm* — Wenderoth, Lind & Ponack, L.L.P.

(57) ABSTRACT

The invention relates to a device for detachably securing modules (1), such as tool holders, to a third component (3), such as a rotatable tool disk for a machine tool, including a controllable securing device (51, 53), by which the respective module (1) can be re-secured in a detachable manner in a locked position on the third component (3) by individual securing parts (15). A release device (76, 77) at least partially helps to release the securing device (51, 53) in a release position, such that the release device (76, 77) at least at the beginning of releasing, exerts pressure on the securing device (51, 53) for releasing the individual securing parts (15).

23 Claims, 7 Drawing Sheets

(58) Field of Classification Search
USPC .......................................... 269/309, 32, 310
See application file for complete search history.

(56) References Cited

FOREIGN PATENT DOCUMENTS

| | | |
|---|---|---|
| DE | 10 2015 012 938 | 4/2017 |
| EP | 0 827 806 | 3/1998 |

\* cited by examiner

DEVICE FOR DETACHABLY SECURING MODULES

FIELD OF THE INVENTION

The invention relates to a device for detachably securing modules, such as tool holders, to a third component, such as a rotatable tool disk for a machine tool. The device has a controlled securing device, by which the relevant module can be secured on the third component in a locking position in a detachable manner using individual securing parts and has an unlocking device. The unlocking device supports at least partially the re-detachment of the securing device into an unlocked position.

BACKGROUND OF THE INVENTION

Such devices for detachably securing modules are known from the prior art. DE 101 55 077 B4 discloses a clamping device, in particular for clamping work pieces for machining purposes, having a reference plane plate that has a planar clamping surface defining a reference plane and at least two clamping openings with walls. On each wall at least one reference surface is formed. A clamping plate has a plane to be applied to the clamping surface and at least two clamping bolts associated with the clamping openings and each having a positioning surface. The positioning surfaces are associated with the reference surfaces. A tightening device is adapted to apply an axial force and a superimposed radial force to the clamping bolt to use the axial force to press the base of the clamping plate against the clamping surface of the reference plane plate and to press the clamping bolt with their positioning against the reference surfaces by the radial force.

For controlling retracting handles, a latch gear, which is centrally driven by an actuator, is provided in one exemplary embodiment of the known solution. Furthermore, a kind of pressure-exerting device is preferably assigned to every clamping bolt, in particular in the form of a rubber buffer device, which pre-tensions the clamping bolt with an axial force that is directed out of the clamping opening. This pre-tensioning aids in lifting the clamping plate from the reference plane plate after detaching the tightening device. A particularly simple handling is then achieved.

The latch gear is further provided with a retraction device, which is formed by at least two tension springs. The tension springs are received in axial drilled holes of the receiving housing and move the retracting handles toward each other into a position in which they no longer protrude into the clamping openings in a securing manner. In this way, in the context of simplified handling, the detaching operation for the retracting handle can again be supported, to remove the clamping plate as a module as a third component from the reference plane plate, which has just been designed in this way.

From DE 10 2015 012 938 published by the proprietor, a securing device for securing modularly designed tool holders on a rotatable tool disk as a third component of a machine tool, having individual securing bolts, which can be used to connect the respective tool holder to the tool disk in a connecting position, is known. Because in this solution a locking device is provided, by which the individual tool holder can be detachably locked on the securing bolt, the operator can perform the locking operation quickly and easily by actuating the locking device. Furthermore, a precise locking of the tool holder module on the tool disk is achieved in this way, resulting in a highly accurate machining using the machine tool. The locking device in turn has, in the manner of a latch gear and mutually interacting locking bolts, which, controlled by a central actuator, reach a locking position, in which the assignable tool holder is latched or connected to the securing bolt.

In this solution as well, a tension spring is again arranged between the ends of a pair of locking bolts facing each other, which spring supports the return movement of the securing bolt in the position detaching the securing bolt.

The known latch gear solutions have wedge-shaped slanted surfaces on their slide-shaped locking bolt for the engagement with the respective clamping or securing bolts. The bolts are prone to self-locking depending on the slant angle in such a system, which complicates the individual unlocking process and can cause obstacles in operation, especially when detaching the relevant clamping or securing device, impairing reliability.

SUMMARY OF THE INVENTION

Based on this prior art, the invention addresses the problems, while maintaining the advantages, of the known solutions, namely ensuring a well-fitting, detachable mount of modules on third-party components that is easy to use, further improving the mount to the effect that the reliability is increased.

A device according to the invention solves this problem.

Because the invention provides that the unlocking device exerts, at least at the beginning of the re-detaching process, preferably permanently acting, a compression force on the securing device to detach the individual securing parts, any jamming, possibly due to self-locking, especially in latch gears, can definitely be excluded. The compression significantly increases the reliability.

While for the known tensile force spring solutions the highest tensile or detaching force is applied at the beginning of re-detaching, the mechanical pressure force solution according to the invention can be used to apply and maintain a substantially continuous pressure-release force on locking bolts of the securing device over the entire detaching process. This solution facilitates the detaching process and ensures in any case that the wedge-shaped locking bolts at the end definitely disengage from the securing parts of the third component despite any self-locking effects, without the need for increased operating forces.

The scope of the invention is providing the device at the modules, which is also the preferred solution. They can, however, also be arranged directly on the third component.

With particular advantage, the securing and unlocking devices can be controlled by a common actuator. The common actuator actuates at least the securing device in an actuating direction and at least the unlocking device in the reverse direction of actuation. In this way, the securing and removal of the relevant module, such as a tool holder, on the third component, such as a tool disk, can be performed in a particularly simple, fast and convenient manner.

In particularly advantageous embodiments, the securing device has a blocking gear having individual locking bolts, which interact with the securing parts of the third component. The unlocking device has a latch gear having latches, which are at least partially in engagement with the locking bolts, at least for exerting the pressure force, or are in force-fitting engagement with the locking bolts.

For such a transmission design, the arrangement can be made with particular advantage such that the locking bolt and the latches move towards each other. The latches are located in a spanned common plane traversing the relevant module or third component. The actuator moves along a route, which is also located on this plane. Because all the movable components are located on a common plane, both transmissions can be designed particularly narrow such that they can be housed without difficulty even in compact components, such as tool holders, where only limited installation space is available.

In particularly advantageous embodiments, a preferably spring-actuated restoring device is provided, which supports the unlocking device in the unlocking of the locking bolt. Unlocking is done in a particularly secure manner, because in addition to breaking the locking engagement of the locking bolt upon the action of the pressure force, an additional return movement occurs in the detaching direction.

With particular advantage, the locking bolt controlled by the actuator may be guided longitudinally displaceably in channel-shaped recesses in the module or the third component. In this way, relatively large traversing movements for the locking bolts of the blocking gear and the latches of the latch gear can be implemented in a space-saving manner.

For forming the latching between locking bolt and the relevant securing part, the arrangement can advantageously be made such that the respective locking bolts have a wedge surface in the form of a securing bolt at the end facing the adjacent securing part. The wedge surface precisely engages in the locked state with an assigned annular groove in the securing bolt. As a result, a latch can be formed by positive engagement.

With regard to the design of the actuator, the arrangement can be made with advantage such that the actuator has a wedge-shaped first actuating part at its free front end. The first actuating part pushes the pairs of locking bolts apart with increasing penetration motion and pushes them into engagement with the adjacent annular groove of a securing part. A second actuating part on the side opposite the first opposite actuating part actuates the unlocking device in the reverse direction from the penetration motion upon the return movement. As a result, both the blocking gear and the latch gear can be controlled by a single control element.

In particularly advantageous embodiments, the actuator forming the second actuating part has a slanted surface. The slanted surface is formed on the wedge-shaped side of the actuator opposite from the first actuator and acts as a control surface for the latch gear of the unlocking device upon the return movement of the actuator to move it into the unlocking detachment position.

With regard to the design of the latch gear, the arrangement may advantageously be made such that a pair of latches having two latches is provided for every locking bolt that can be driven into the secured position by the first actuating part. The latches can be moved in channels located in the same plane as the channel-shaped recesses guiding the locking bolts.

In each of these pairs of latches, a first latch can be driven in a direction parallel to the direction of the locking bolt by the slanted surface of the second actuating part in its return movement and as a result move the relevant second latch of the pair of latches in the direction perpendicular to the movement of the locking bolts using further interacting slanted surfaces. Control surfaces of the second latches come into engagement with slanted contact surfaces located in recesses of the locking bolt and there generate the pressure force that moves the relevant locking bolt in the unlocking direction.

In a particularly advantageous manner, the actuator may have a control body having the first and second actuating parts. The control body can be moved by an adjusting screw for the penetration and return movement. The adjusting screw can be actuated in a rotary manner from an end face of the module or third component.

In exemplary embodiments in which four securing bolts are located on the contact surfaces, on which the module and the third component can be attached to each other by the securing device. The bolts are grouped in pairs around a central region. The arrangement can be made with particular advantage such that every locking bolt of a pair of locking bolts, which is actuated by the wedge-shaped first actuating part, controls one further locking bolt each at the location where it latches to its assigned securing bolt. Its assigned securing bolt can each be latched to a securing bolt of a further pair of securing bolts in a detachable manner. As a result, only one securing device and unlocking device each are required for latching and unlatching of both pairs of securing bolts.

The linear direction of travel of the pair of locking bolts may coincide with the linear direction of travel of the first pair of latches. The linear direction of travel of the pair of further locking bolts may coincide with the linear direction of travel of the second pair of latches. The pair of locking bolts, the pair of further locking bolts, and the first pair of latches and the second pair of latches may be disposed on either side of a symmetrical plane that is perpendicular to the mounting plane. In each case, a locking bolt, a further locking bolt and a first latch and a second latch on each side of the plane of symmetry may be arranged symmetrically to each other. The pair of locking bolts and the pair of further locking bolts may, in particular in the starting position of the securing device, be arranged in a U-shape. For that purpose, the further locking bolts each form the legs of the U-shape. The pair of locking bolts, which are aligned in the same direction, constitutes the connection of these legs of the U-shape. Between the further locking bolts, the central area can be arranged, preferably centrally, namely in the open center of the U-shaped bolt configuration.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
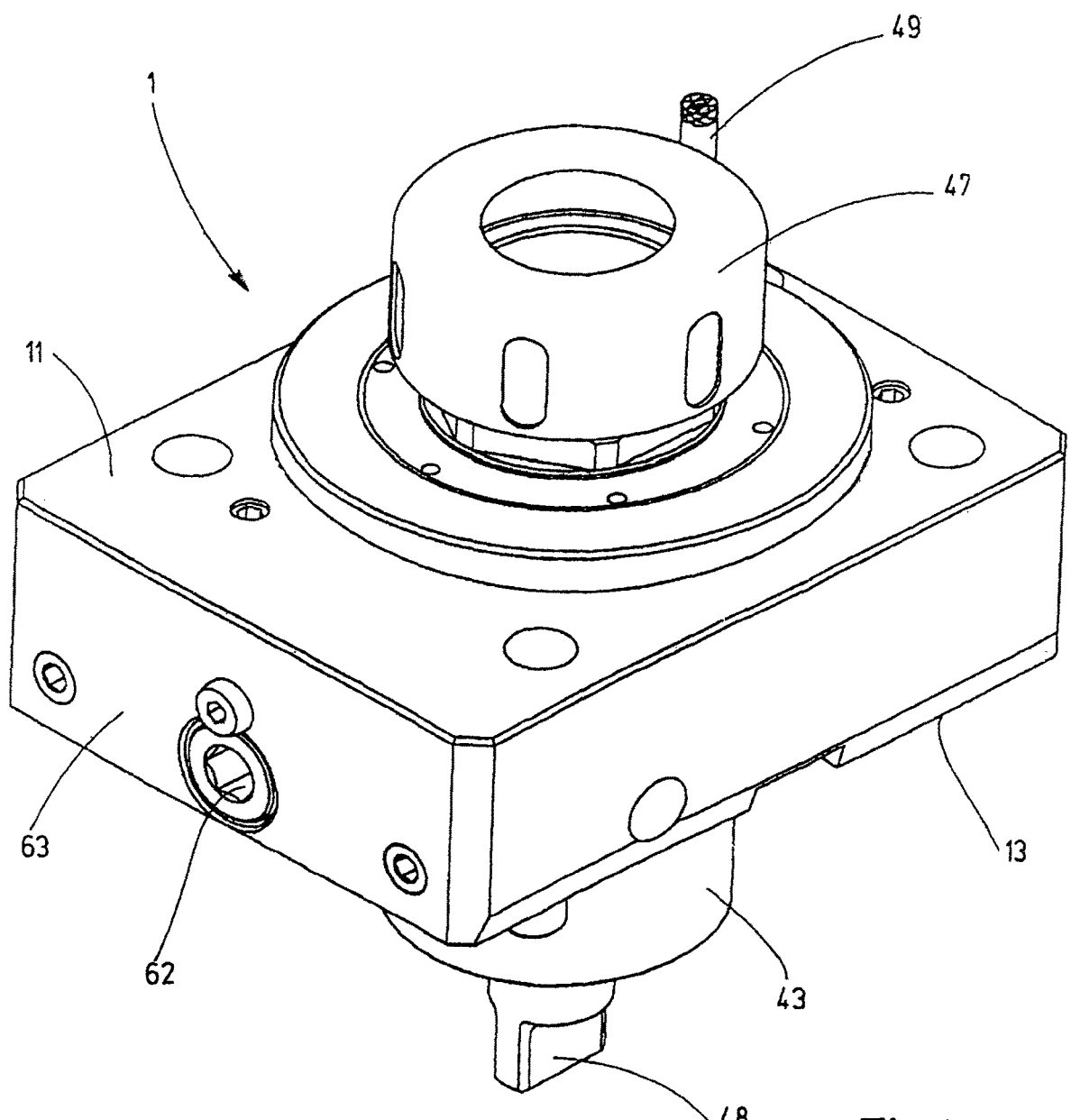
FIG. 1 is a perspective view of a tool holder on which a device according to an exemplary embodiment of the invention can be attached to a tool holder.
Figure 2:
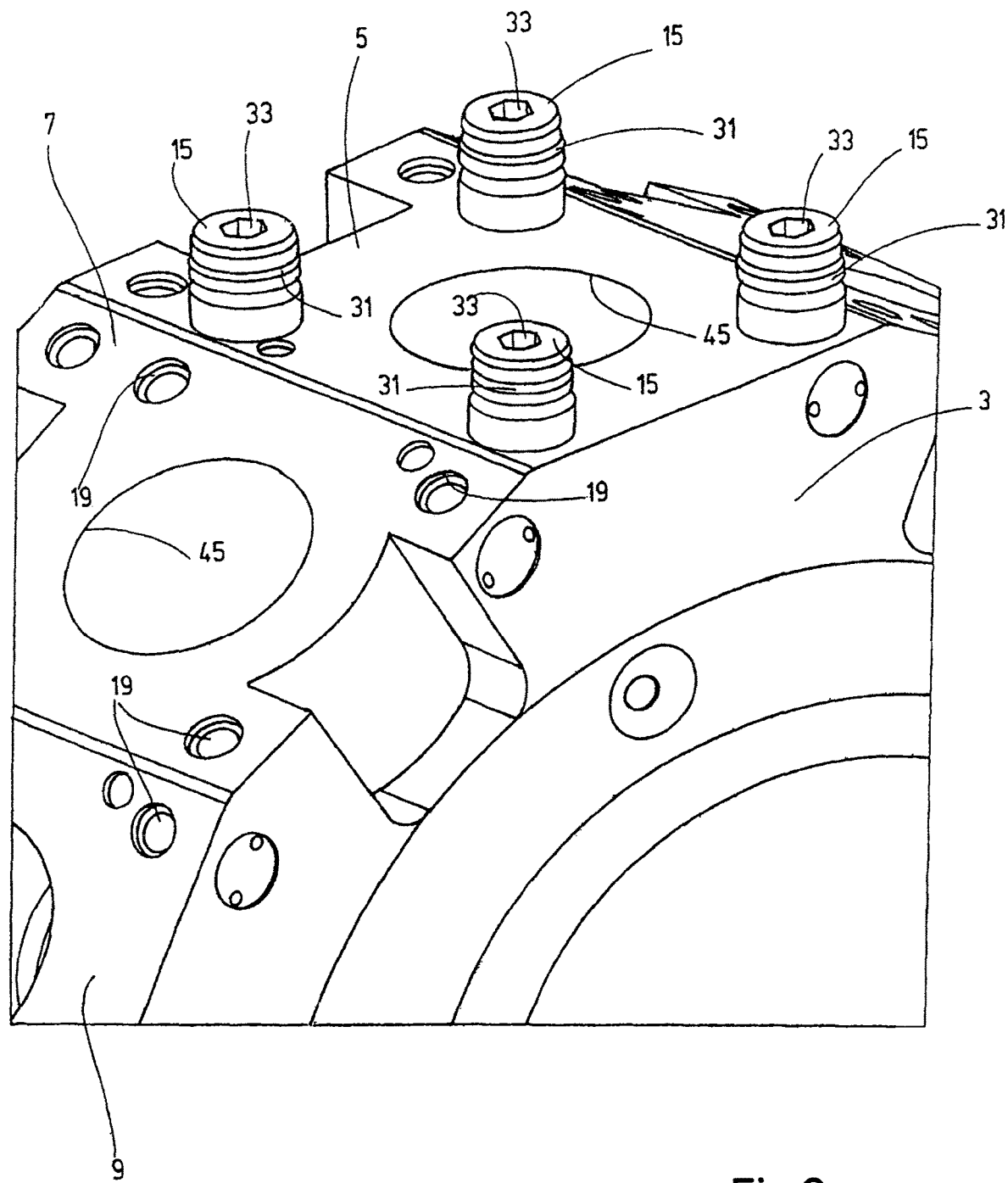
FIG. 2 is a partial perspective view of only one peripheral region of a tool disk on which a tool holder can be secured by the device according to the exemplary embodiment of the invention.

Using the accompanying drawing, the invention is described based on an exemplary embodiment in which a tool holder 1 can be secured at the contact surface of a tool station on the circumference of the tool disk of a tool turret. Instead of a tool holder 1, a different type of module can be attached to a third component, which module is different from a tool disk. FIG. 2 shows a peripheral portion of the tool disk 3, wherein only the contact surface 5 of the contact surfaces 5, 7 and 9 of the tool disk 3 visible in FIG. 2 is prepared for the clamping of the tool holder 1. The tool holder 1 has a base body 11 in the form of a cuboid having a rectangular outline. On the base body underside 13, a planar securing surface can be clamped to one of the contact surfaces, in the example shown, to the contact surface 5 of the tool disk 3. For this purpose, the contact surfaces, in FIG. 2 only shown for the contact surface 5, are provided with securing parts in the form of four securing bolts 15. Securing bolts 15 are mounted in pairs to the corner areas of the relevant contact surface, which in FIG. 2 is shown only for the contact surface 5.

Figure 3:
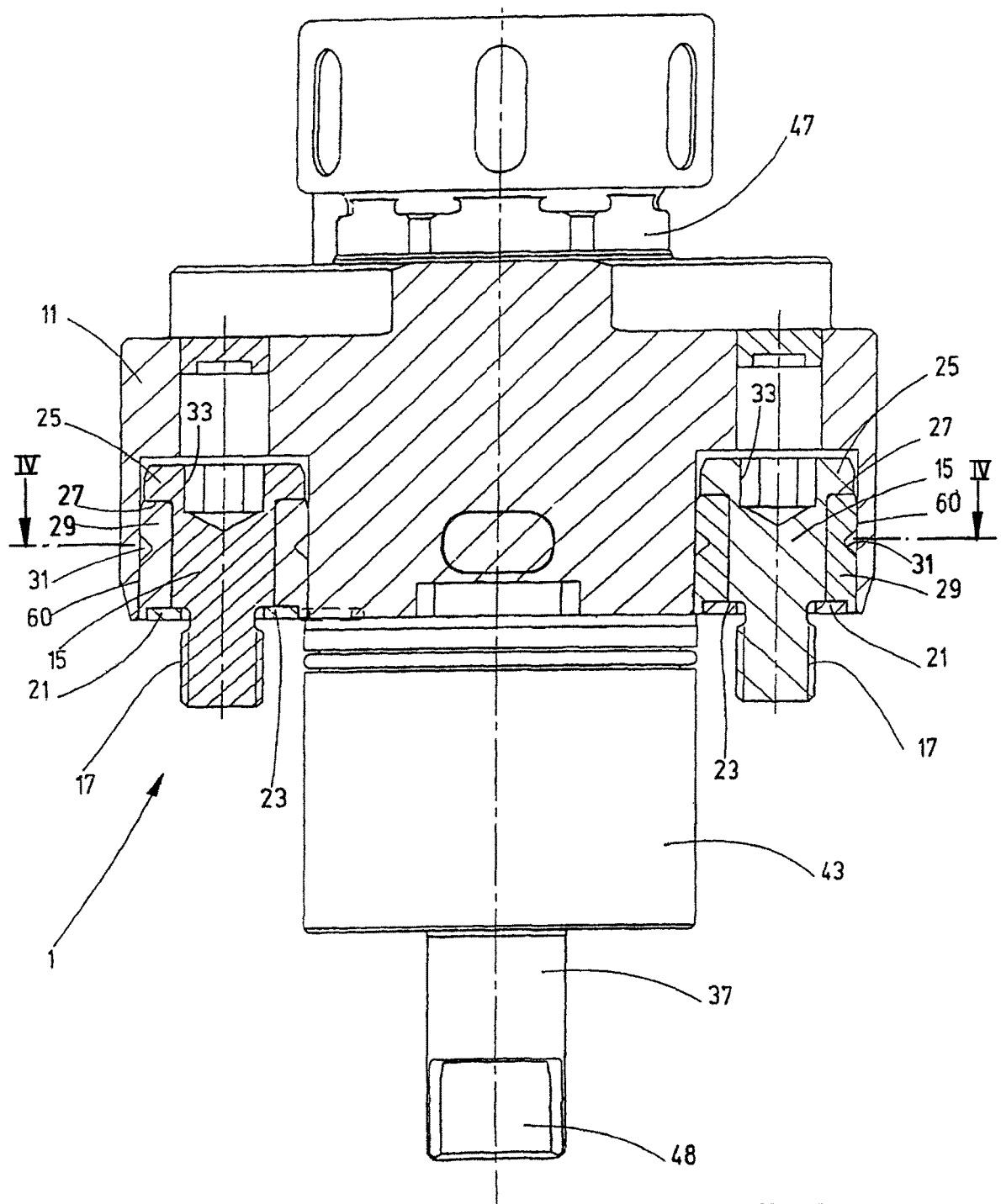
FIG. 3 is a side view in section of the tool holder of FIG. 1, the base body of which is cut along a section plane from one corner region to the other corner.

The securing bolts 15 have a male thread 17 at the end assigned to the tool disk 3, which threads are used to screw it into a threaded bore 19 of the relevant contact surface. An annular disk 21 rests against the securing bolt 15 on a collar 23 where the diameter of the securing bolt 15 increases relative to the external thread 17, and is in contact with the relevant contact surface 5, see FIG. 3. A locking sleeve 29 is axially attached to the relevant securing bolt 15, which has a predeterminable radial clearance, between this collar 23 and a further collar 27 formed at the transition to the screw head 25. An annular groove 31 is incorporated in the outer circumference of the locking sleeve 29 as a locking element for the latching device to be formed. The screw head 25 of the securing bolt 15 has a hexagon socket 33 for screwing it into the threaded holes 19.

The base body 11 has a spindle bearing having roller bearings for a tool spindle 37 in the usual manner of such tool holders 1. One of the roller bearings is within a tube 43 axially projecting from the base body 11. Tube 43 extends into a drilled receiving hole 45 located in the contact surface 5, if the tool holder 1 is attached to the contact surface (FIG. 2). The tool holder 47, formed in the usual way, for a rotatably drivable tool (not shown) is located at the upper end of the tool spindle 37, protruding above the base body 11. If the tool holder 1 is in the connecting position, a flat coupling web 48, formed at the lower end of the spindle 37 in FIG. 3 in a manner known per se, engages in a coupling manner with the coupling part of a driven end of the motor located in the tool disk 3, if the tool holder 1 is in the working position. The end of the spindle may have a different shape, for example, be designed as a 2-flat wedge or as a splined wedge (DIN 5480, 5482). A line 49 is provided for the supply of cooling lubricant to the work area and originates at the top of the base body 11. The device according to the invention is also suitable for static solutions, i.e., the machining tool is not driven, but simply rigidly clamped in the tool holder 1 (not shown).

FIGS. 4 to 7 show details of an exemplary embodiment of the device according to the invention, located in the base body 11 of the tool holder 1. It can also be installed in a relevant third component, such as the tool disk 3. A securing device 51, 53 can be used to attach the module on the third component 3 in a blocking position in a detachable manner using the securing bolts 15. One locking bolt 51, 53 each is provided for latching to each of the four securing bolts 15. In this case, a pair of first locking bolts 51 is provided for latching to the lower pair of securing bolts 15 in FIGS. 4 to 6. For the upper pair of the securing bolts 15 in these figures, a second pair of locking bolts 53 is provided. Each pair of locking bolts 51 and 53 is formed as identical parts in the manner of rods, which can be moved in channels extending in a horizontal plane in the base body 11. A channel 55 is provided for the locking bolts 51 of the first pair. The channels 57, 59 are provided for the locking bolts 53 of the second pair. The channels 55, 57, 59 open in the base body 11 into a recess each having the form of a cylindrical drilled hole 60 (FIG. 3), with which an assigned securing bolt 15 engages in the connecting position.

The tool spindle 37, the tube 43, the tool holder 47 and the coupling web 48 are arranged within a fictitious cuboid, not shown in the figures. Every side edge of the cuboid extends through one of the four recesses in the form of cylindrical drilled holes 60 and perpendicular to the horizontal plane.

The design of the blocking gear having the locking bolts 51 and 53 corresponds, as far as the geometry of the locking bolts 53 and the geometry of the outer sections of the locking bolt 51 interacting with a relevant securing bolt 15 are concerned, to the solution, as is described in the publication DE 10 2015 012 938 by the proprietor. Accordingly, the locking bolts 51 are formed by identical parts, have a special shape at the end assigned to the relevant securing bolt 15 and are pre-stressed at the inner end facing away from the securing bolt 15 by a tension spring 61 for a return movement. The locking bolts 51 move towards each other. At the end facing the securing bolt 15, the locking bolts 51 have a shape in which, starting from the outer end, a slightly curved slanted surface 67. Slanted surface 67 largely extends at an angle of about 45° to the longitudinal axis of the bolt and merges into a rib 68. Rib 68 forms the actual engagement part for the latching or clamping by engagement with the annular groove 31 of the relevant securing bolt 15. At the end area opposite the inclined plane 67, each locking bolt 51 forms a further slanted surface 69, which extends at an angle of approximately 20° from the longitudinal axis of the bolt and interacts with an end surface 70 having an adapted slope of the assigned locking bolt 53 of the second pair. Slanted end surfaces 70 move these locking bolts 53 in the direction of the securing bolt 15 of the second pair when the locking bolts 51 and move apart against the restoring force of the tension spring 61. An actuator provided for this purpose has a control body 66, which can be moved along a positioning axis 38 perpendicular to the axis of the locking bolt 51 and which forms a first actuating part in the form of a wedge surface 64 at the front end facing the locking bolt 51. In a penetration movement along the axis 38, the wedge surface 64 drives the locking bolt 51 apart for the locking engagement using the associated securing bolt 15. The slanted surfaces 69 interacting with the relevant end surface 70 bring the engagement ends 72 of the second locking bolts 53 into in locking engagement with the assigned securing bolts 15. For differently designed interfaces at the user side, angles other than the specified angle of approximately 20° may result as well.

The engagement ends 72 are shaped such that the latching engagement on the securing bolts 15 is not self-locking, as is the case when the ribs 68 of the first locking bolt 51 engage with the assigned securing bolts 15. In order to bring the first locking bolt 51 out of latching engagement, and thus, bring the securing device of the device to its unlocked position, an unlocking device 75 is provided.

In an exemplary embodiment not shown in detail in the figures, the unlocking device has compression springs, which engage with the rear ends of the locking bolts 51 facing away from the actuator and permanently exert a compression force in the direction of the actuator on the locking bolts 51. The compression springs are preferably tapered towards the ends of the locking bolts 51, which enables the compression springs to extend through an interstice formed between the end surfaces 70 of the locking bolts 53 and the securing bolt 15 closest to the end surfaces 70 and to exert a compression force on the locking bolts 51 in any position of the locking bolt 51 in the channels 55. The pressure force applied by a relevant pressure spring pushes the relevant locking bolt 51 out of engagement with securing bolt 15 nearest to the rear end of this locking bolt 51 facing away from the actuator and in addition can push this locking bolt 51 in its initial position in the direction of the actuator. The tension spring 61 then does not have to be provided in an unlocking device designed in this way.

As shown in FIGS. 4-7, the unlocking device is provided with a latch gear formed by latches 76 and 77, which latch gear can be actuated to generate a compression force on the first locking bolt 51, which force pushes the locking bolt 51 out of engagement with the securing bolt 15. The latch gear can be supported by the unlocking device described above using compression springs. In doing so only one compression spring, which presses on a locking bolt 51, may suffice. The unlocking device in the form of a latch gear is the preferred embodiment due to the superior permanent transmission of pressure force. Alternatively, the solution of an unlocking device having the compression springs is also possible. If compression springs are used, their direction of force is parallel to the transmission of force of the tension spring 61 onto the two locking bolts 51. In that regard, the tension spring 61 supports the relevant unlocking process as a pulling unlocking device, be it by at least one compression spring and/or described the latch gear described in more detail below.

In addition to the wedge surface 64, the control body 66 has a second actuation part for the control of the latch gear, which second actuation part is formed by a slanted surface 74 located at the side of the control body 66 facing away from the wedge surface 64 forming the first actuation part. Slanted surface 74 interacts with two first latches 76 of a first pair of latches. For the penetration movement of the control body 66 and its reverse return movement, an adjusting screw 62 is provided. Screw 62 is screwed into the female thread 37 of the drilled hole in the base body 11 defining the positioning axis 38 and can be actuated by rotation from the front side 63 of the base body 11.

Figure 4:
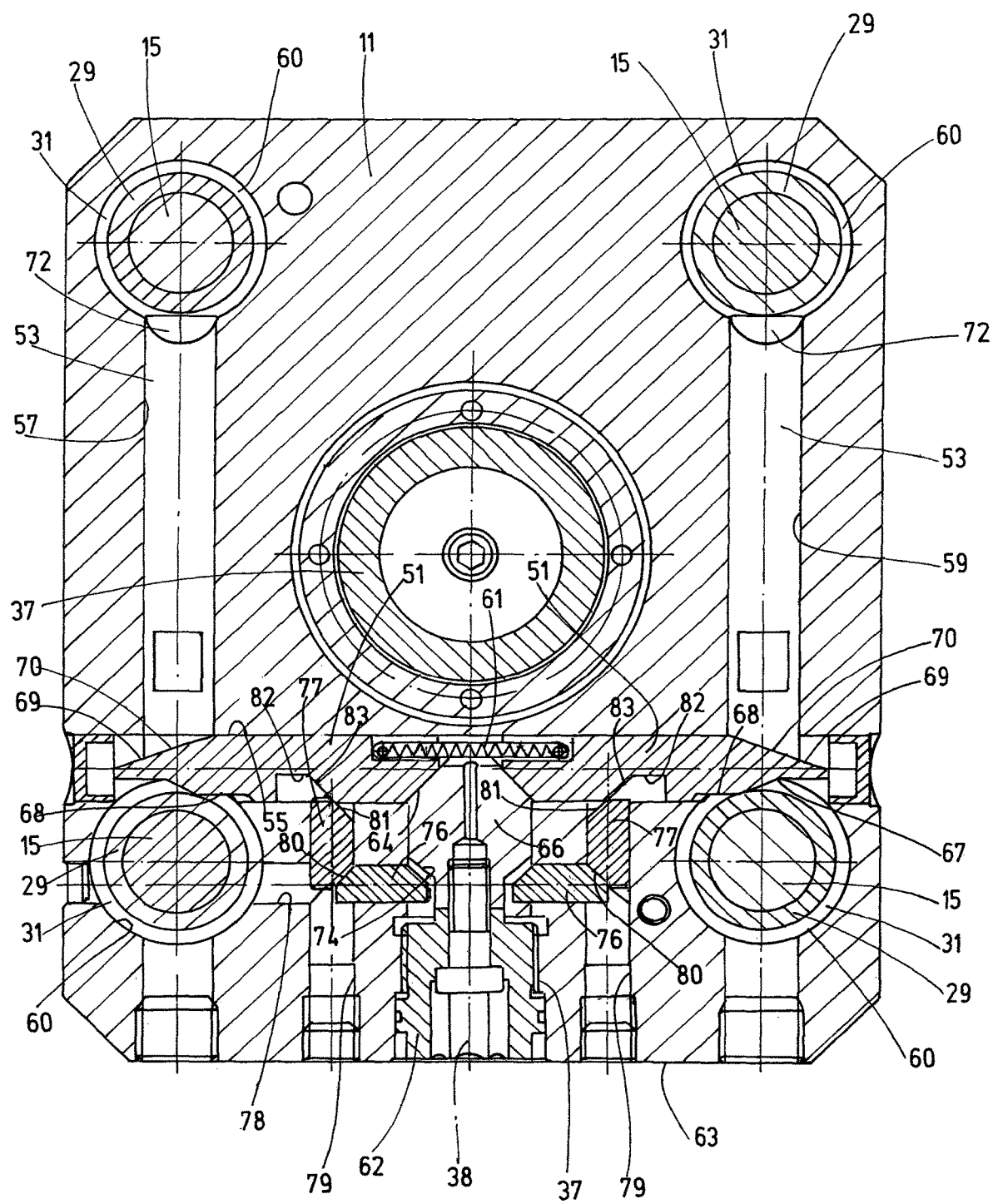
FIG. 4 is a top plan view in section of the tool holder provided with the exemplary embodiment of the device according to the invention, taken along the section line IV-IV of FIG. 3, shown in the locking position of the device.
Figure 5:
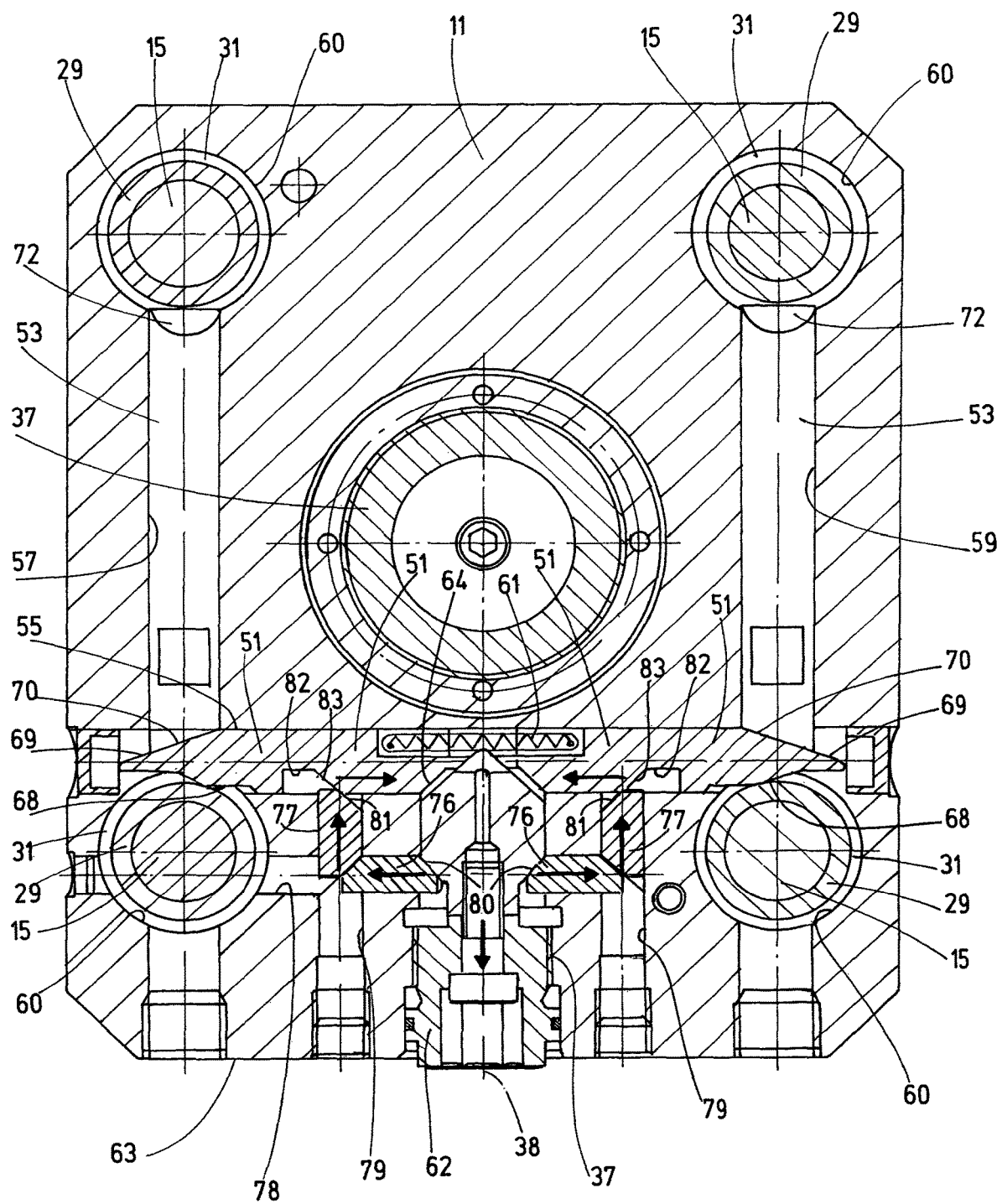
FIG. 5 is a top plan view in section taken along the section line IV-IV of FIG. 3, the device being shown in an intermediate position.
Figure 6:
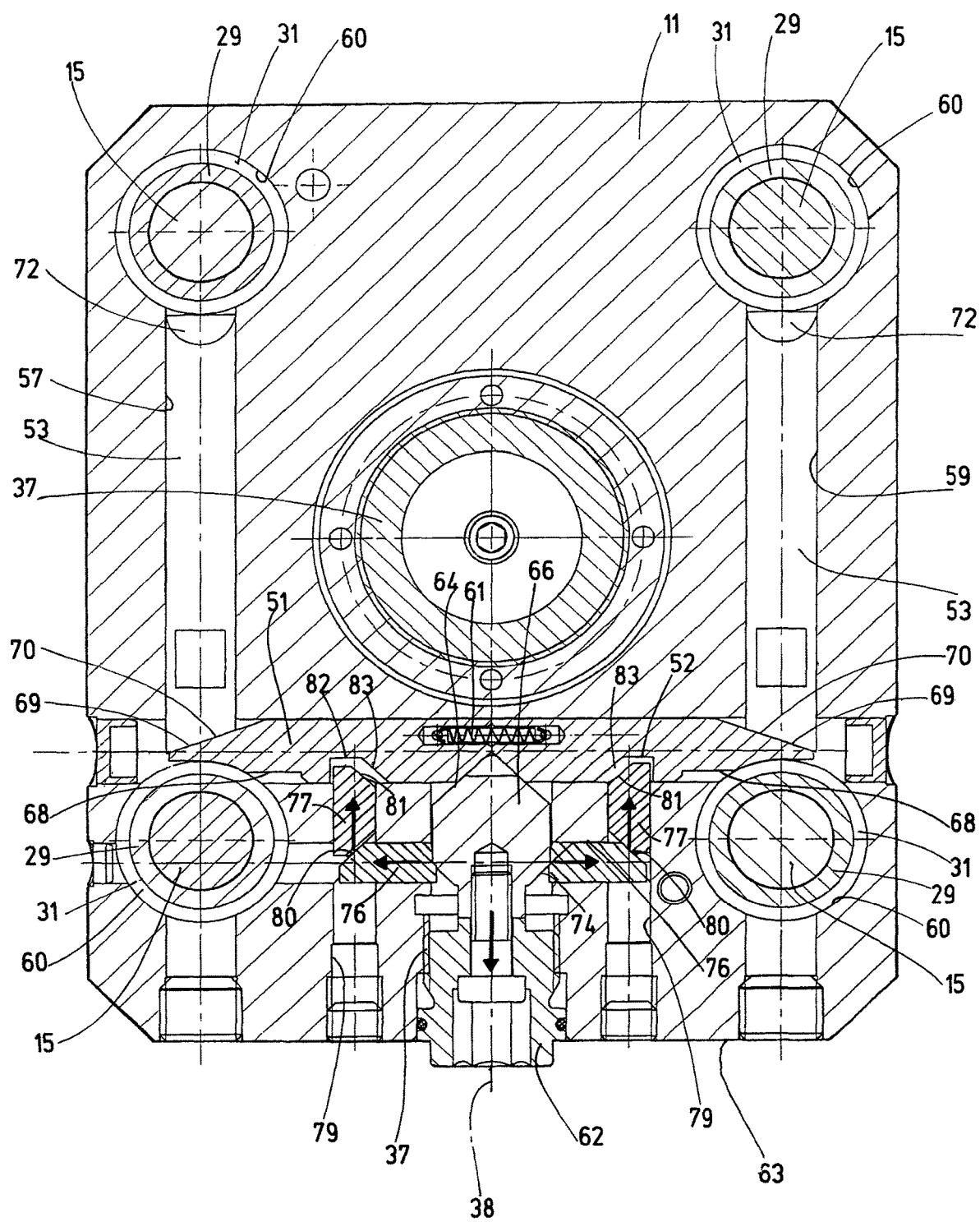
FIG. 6 is a top plan view in section taken along the section line IV-IV of FIG. 3, the device being shown in the unlocked position.

FIG. 4 shows the state of the blocked position, in which the first locking bolts 51 are driven apart by the penetration movement of the wedge surface 64 of the control body 66 and are in latching engagement with the respective locking bolts 15. To transfer the device to the unlocked position, the control body 66 is moved to the outside by the adjusting screw 62. If in the course of this movement, the intermediate position shown in FIG. 5 is reached, the latching engagement of the locking bolt 51 with the securing bolt 15 initially persists due to self-locking effects despite the restoring force of the tension spring 61. In the further outward positioning movement of the control body 66, the slanted surface 74 of the control body 66 forming the second actuation part comes into contact with a facing slanted surface of the first latches 76 and drives the first latches 76 apart upon further adjusting movement, see the arrows in FIG. 5, wherein they move in a channel 78 extending in parallel to a direction of movement of the locking bolt 51. In doing so, the first latches 76 come into engagement with a second latches 77 of a second pair of latches. These second latches 77 are movable in channels 79, which extend perpendicular to the direction of movement of the locking bolt 51. During the moving apart of the first latches 76, they drive the second latches 77 in the direction of the locking bolts 51 using interacting slanted surfaces 80. Each locking bolt 51 has a recess 82 for the respective second latch 77. In each recess 82, a slanted contact surface 83 is located, along which the second latches 77 slide in the upward movement in FIG. 5 and thereby generate a pressure force on each locking bolt 51, which force drives them against each other. This movement of each locking bolt 51 results in the inevitable breakaway of the self-locking of the ribs 68 at the securing bolt 15, as shown in FIG. 6, with the second latches 77 in their most elevated position. The locking bolts 51 are pulled into the final unlocking position after the tension spring 61 has overcome the self-locking effect, in which final unlocking position the contact surfaces 83 of the recess 82 are lifted from the associated control surface 81 of the second latches 77.

The linear directions of travel of the first pair of latch bolts 51 and the first pair of latches 76 coincide. Likewise, the linear directions of travel of the second pair of latch bolts 53 and the second pair of latches 77 are identical. The first and the second pair of latch bolts 51, 53 and the first and second pairs of latches 76, 77 are arranged on both sides of a symmetry plane, which is perpendicular to the horizontal plane as the spanning plane. In each case first and second latch bolts 51, 53 and first and second latches 76, 77 are arranged symmetrically to each other on each side of the symmetry plane. The first and second pairs of locking bolts 51, 53 are arranged in a U-shape. For that purpose, the second pair of locking bolts 53 forms the legs of the U-shape, and the first pair of locking bolts constitutes the connection of these legs of the U-shape.

Figure 7:
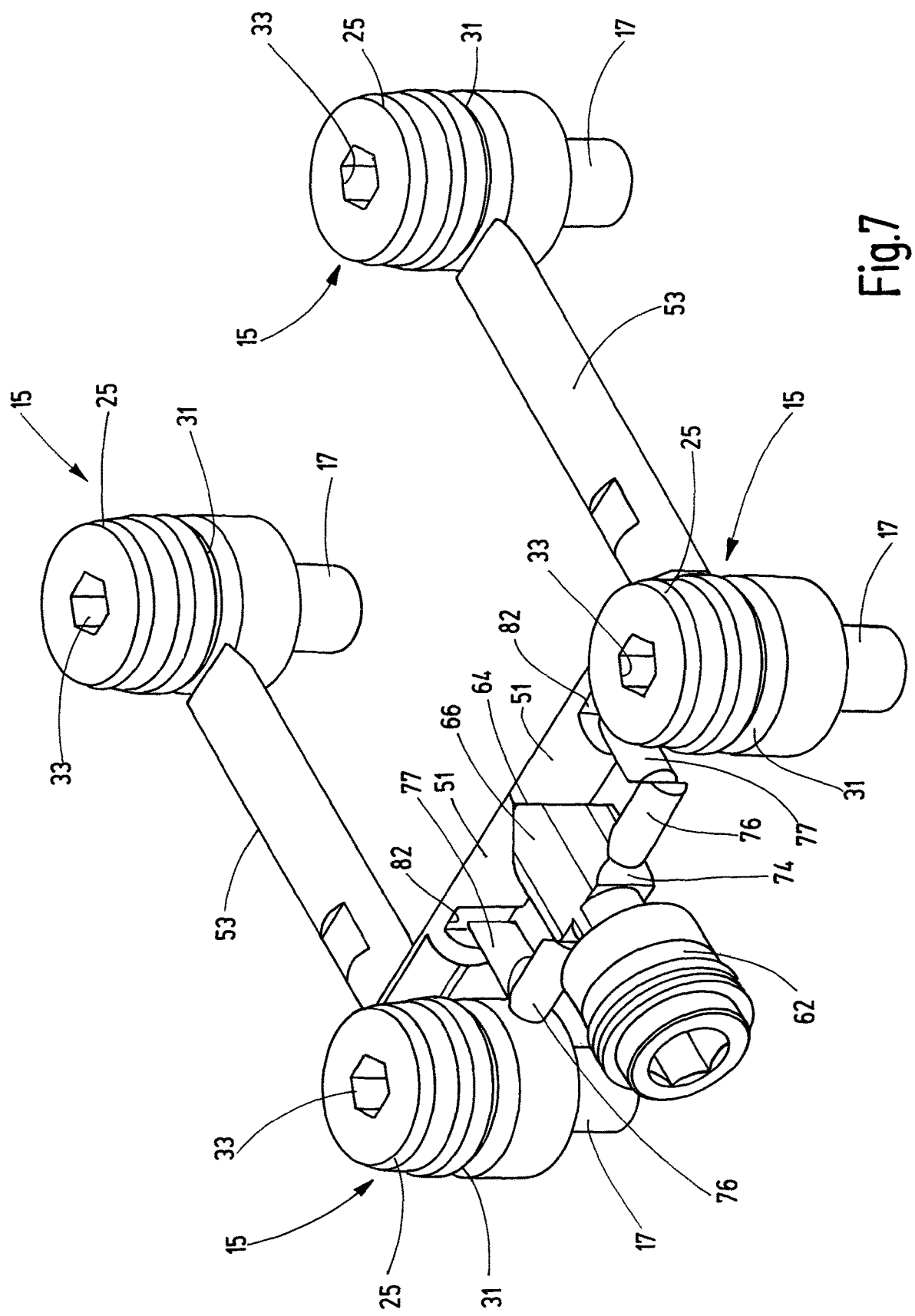
FIG. 7 is a perspective view of only the functional parts of the securing device and the unlocking device of the exemplary embodiment of the device according to the invention.

FIG. 7 shows in a separate representation and in assignment to the two pairs of securing bolts 15, the components of the blocking gear and the latching gear together with the actuator having the control body 66 and screw 62 common to the two gears. The restoring device, which is formed in the present embodiment by the tension spring 61, additionally supporting the unlocking process, is not shown in FIG. 7. Instead of the tension spring 61 acting at the inner ends of the locking bolts 51, pressure springs (not shown) can apply a restoring force to the outer ends of the locking bolts 51.

While one embodiment has been chosen to illustrate the invention, it will be understood by those skilled in the art that various changes and modifications can be made therein without departing from the scope of the invention as defined in the claims.

The invention claimed is:

1. A device for securing a module to a component, comprising:
   individual securing parts attaching the module to the component;

a controlled securing device locking the individual securing parts in positions attaching the module and the component, the securing device having first and second locking bolts interacting with and locking the individual securing parts; and an unlocking device driving the securing device into an unlocked position disengaged with the individual securing parts by applying a retracting force on the first and second locking bolts, respectively, directly pushing the first and second locking bolts toward one another upon movement of first and second latches to unlock the individual securing parts, the unlocking device having the first and second latches engaging the first and second locking bolts, respectively, and exerting the retracting force thereon.

2. The device according to claim 1 wherein a common actuator controls the securing device and the unlocking device, actuates the securing device in an actuating direction and actuates the unlocking device in an unlocking direction opposite the actuating direction.

3. The device according to claim 1 wherein the individual securing parts comprise four securing bolts located on a contact surface of a tool holder forming the module and attaching the tool holder to a tool disk forming the component, the securing bolts being grouped in first and second pairs around a central region.

4. The device according to claim 3 wherein the first and second locking bolts are actuated by a wedge-shaped first actuating part and control third and fourth locking bolts, respectively, at locations where the first and second locking bolts detachably lock to the first pair of securing bolts, the third and fourth locking bolts detachably locking the second pair of securing bolts.

5. The device according to claim 2 wherein the first and second locking bolts are movable toward the first and second latches, respectively, for locking and are located in a spanned common plane through which the module or the component extends; and the common actuator is movable along a path lying in the spanned common plane.

6. The device according to claim 1 wherein the first and second locking bolts are spring biased by a restoring device toward the unlocked position thereof.

7. The device according to claim 1 wherein the first and second locking bolts are guided for displacement in first and second channel-shaped recesses, respectively, in the module or the component.

8. The device according to claim 1 wherein each of the first and second locking bolts comprise a rib at one end thereof facing the respective securing part, the securing parts being locking bolts with annular grooves, the ribs engaging the annular grooves in a locked state of the first and second locking bolts.

9. The device according to claim 8 wherein a common actuator controls the securing device and the unlocking device, actuates the securing device in an actuating direction and actuates the unlocking device in an unlocking direction opposite the actuating direction; and the common actuator comprises wedge-shaped first and second actuating parts, the first actuating part being at a free end of the common actuator and engaging and pushing the first and second locking bolts apart upon an increasing penetration motion in a first direction between the first and second locking bolts and pushing the ribs of the first and second locking bolts into engagement with the annular grooves, the second actuating part being on a side of the common actuator opposite the first actuating part and unlocking the first and second locking bolts from the individual securing parts upon movement in a second direction opposite the first direction.

10. The device according to claim 9 wherein the second actuating part comprises slanted surfaces forming a wedge shape, the slanted surfaces acting as control surfaces for the first and second latches unlocking the first and second latches upon movement of the common actuator in the second direction.

11. The device according to claim 7 wherein a common actuator controls the securing device and the unlocking device, actuates the securing device in an actuating direction and actuates the unlocking device in an unlocking direction opposite the actuating direction;

the common actuator comprises wedge-shaped first and second actuating parts, the first actuating part being at a free end of the common actuator and engaging and pushing the first and second locking bolts apart upon an increasing penetration motion in a first direction between the first and second locking bolts pushing the first and second locking bolts into engagement with the individual securing parts, the second actuating part being on a side of the common actuator opposite the first actuating part and unlocking the first and second locking bolts from the individual securing parts upon movement in a second direction opposite the first direction;

each of the first and second latches comprises first and second latch parts being drivable into locking positions by the first actuating part, being movable in channels located in a common plane with the channel-shaped recesses guiding the first and second locking bolts.

12. The device according to claim 11 wherein the second actuating part comprises slanted surfaces forming a wedge shape, the slanted surfaces acting as control surfaces for the first and second latches unlocking the first and second latches upon movement of the common actuator in the second direction; and each of the first latch parts are drivable in a direction parallel to a longitudinal direction of the first and second locking bolts by the slanted surfaces of the second actuating part moving in the second direction and move the second latch parts in directions perpendicular to movement of the first and second locking bolts using interacting slanted surfaces on the first and second latch parts; and control surfaces on the second latch parts engage with slanted contact surfaces in recesses of the first and second locking blots generating the retracting force on the first and second locking bolts unlocking the first and second locking bolts.

13. The device according to claim 2 wherein the common actuator is movable by a rotatable actuating screw in the actuating direction and the unlocking direction, the rotatable actuating screw being actuatable in a rotary manner from an end face of the module or the component.

14. The device according to claim 2 wherein the common actuator comprises a wedge-shaped first actuating part engaging and controlling movement of the first and second locking bolts toward locking positions detachably locking respective pairs of securing bolts of the individual securing parts.

15. A device for securing a module to a component comprising:
- individual securing parts attaching the module to the component;
- first and second locking bolts interacting with the individual securing parts and detachably locking the first and second locking bolts in locking positions thereof;
- first and second latches engaging the first and second locking bolts, respectively, and exerting a retracting force thereon; and
- a common actuator having first and second actuating parts, the first actuating part being wedge shaped at a first end thereof and moving the first and second locking bolts apart in a first direction with an increasing penetration motion forcing the first and second locking bolts in a locking engagement with the individual securing parts, the second actuating part on an opposite second end of the common actuator moving the first and second latches in a second direction opposite the first direction and apply the retracting force to the first and second locking bolts moving the first and second locking bolts toward one another and disengaging the first and second locking bolts from the individual securing parts.

16. The device according to claim 15 wherein the individual securing parts comprise four securing bolts located on a contact surface of a tool holder forming the module and attaching the tool holder to a tool disk forming the component, the securing bolts being grouped in first and second pairs around a central region.

17. The device according to claim 16 wherein the first and second locking bolts control third and fourth locking bolts, respectively, at locations where the first and second locking bolts detachably lock the first pair of securing bolts, the third and fourth locking bolts detachably locking the second pair of securing bolts.

18. The device according to claim 15 wherein the first and second locking bolts are movable toward the first and second latches, respectively, for locking and are located in a spanned common plane through which the module or the component extends; and
the common actuator is movable along a path lying in the spanned common plane.

19. The device according to claim 15 wherein the first and second locking bolts are spring biased by a restoring device toward an unlocking position thereof.

20. The device according to claim 15 wherein each of the first and second locking bolts comprise a rib at one end thereof facing the respective individual securing part, the individual securing parts being locking bolts with annular grooves, the ribs engaging the annular grooves in a locking state of the first and second locking bolts.

21. The device according to claim 15 wherein the second actuating part comprises slanted surfaces forming a wedge shape, the slanted surfaces acting as control surfaces for the first and second latches unlocking the first and second latches upon movement of the common actuator in the second direction.

22. The device according to claim 15 wherein each of the first and second latches comprises first and second latch parts being drivable into locking positions by the first actuating part, being movable in channels located in a common plane with channel-shaped recesses guiding the first and second locking bolts.

23. The device according to claim 22 wherein the second actuating part comprises slanted surfaces forming a wedge shape, the slanted surface acting as control surfaces for the first and second latches unlocking the first and second latches upon movement of the common actuator in the second direction; and
each of the first latch parts are drivable in a direction parallel to a longitudinal direction of the first and second locking bolts by the slanted surfaces of the second actuating part moving in the second direction and move the second latch parts in directions perpendicular to movement of the first and second locking bolts using interacting slanted surfaces on the first and second latch parts; and
control surfaces on the second latch part engage with slanted contact surfaces in recesses of the first and second locking bolts generating the retracting force on the first and second locking bolts unlocking the first and second locking bolts.

* * * * *